July 30, 1963     B. W. TUCKER, JR     3,099,334
ELEVATOR ROLLER GUIDES
Filed May 15, 1962

INVENTOR
BENJAMIN WHITEHEAD TUCKER, JR.

BY J. L. Sharon ATTORNEY

United States Patent Office 3,099,334
Patented July 30, 1963

3,099,334
ELEVATOR ROLLER GUIDES
Benjamin Whitehead Tucker, Jr., South Orange, N.J., assignor to Otis Elevator Company, New York, N.Y., a corporation of New Jersey
Filed May 15, 1962, Ser. No. 194,806
10 Claims. (Cl. 187—95)

This invention relates to guides for movable bodies and in its more specialized aspect it is particularly useful for guiding elevator cars.

It has long been customary to guide elevator cars and their counterweights in their hoistways by the use of T-shaped guide rails mounted on the structure of the hoistway and guide elements mounted on the car or counterweight in positions to engage the rail. In earlier days when cars moved at slow speeds these guide elements were of a shoe type that bore on the front and back surfaces of the rail. Later, as car speeds increased these guide elements took the form of assemblies of rubber tired rollers which are biased into contact with the respective surface of the guide rail by one or more springs having a suitable spring constant. These rollers are mounted on anti-friction bearings—usually of the ball or roller bearing type.

Because it not infrequently happens that the T-shaped guide rails cannot be mounted or maintained in perfect alignment, or the car with its load kept in a balanced condition there is a tendency for the car to sway as it travels up and down the hoistway. This becomes more noticeable as the speed of the car increases.

Also, because it is desirable to check this sway before the surface of the guide rail contacts the base on which the rollers are mounted it is customary to cause the roller rims to press against their guiding surface with a considerable force. As between two opposed rollers, this force will vary depending upon the degree of unbalance or eccentric loading of the car—it being necessary to provide a greater force on one roller than the other to insure that the guide rail is centrally located with respect to the base structure through which it passes.

It has been noted that as the speed of the car increases, not only does the sway become more noticeable and undesirable, but also that the noise becomes more noticeable. Furthermore, this noise usually increased as the size of the car increased and its weight and the magnitude of its eccentric or unbalanced loads increased. Investigation disclosed that two prominent sources of the noise were the wheel bearings and the contact between the guide rail surface and the rubber tire on the wheel rim. Also, that this noise increased as pressure between the surface and tire was increased.

It was also noted that as the tire pressure increased the tendency of the wheel to follow its surface increased. This reduced the freedom of the car to float or ride on its postwise rollers as the spacing of the rails varied in their positions in the hoistway.

It is accordingly an object of this invention to improve the guide elements for elevator cars and counterweights by reducing the noise they generate in their operation.

It is also an object of the invention to reduce the noticeable effect as the car is caused to sway from its straight line of travel by discontinuities in the alignment of the guiding surfaces.

In carrying out the invention these objects are accomplished by making it possible for the guiding rollers to press against their respective guide surfaces with the minimum pressure consistent with maintaining the guide rail centrally disposed with respect to the guide element. This maintenance of car and guide rail positioning is achieved without varying the adjustment of the guide roller with respect to its guide surface such as is shown in United States Patent No. 2,265,086, issued December 2, 1941, to W. Spiro. Also, by providing dampening means, which in this described preferred embodiment take the form of dash pot oil checks, a considerable reduction in the period of oscillation of the car as it is caused to sway is achieved.

The manner in which these improvements are effected and the features and advantages of the invention will become more apparent from the following description of a preferred arrangement which embodies the invention, when considered in conjunction with the drawing in which.

In the description which follows reference will be made to the guide surfaces of the T-shaped guide rail as the front and back side surfaces and the face surface. In this regard reference is made to United States Patent No. 2,100,169, issued November 23, 1937, to C. Norton from which it may be seen that the front surface is that one which is seen as one views the rail from a position at the front or entrance to the hoistway. The back surface is oppositely disposed to the front one and the face surface is the one facing the car, being the edge of the blade and perpendicular to the side surfaces.

Figure 1:
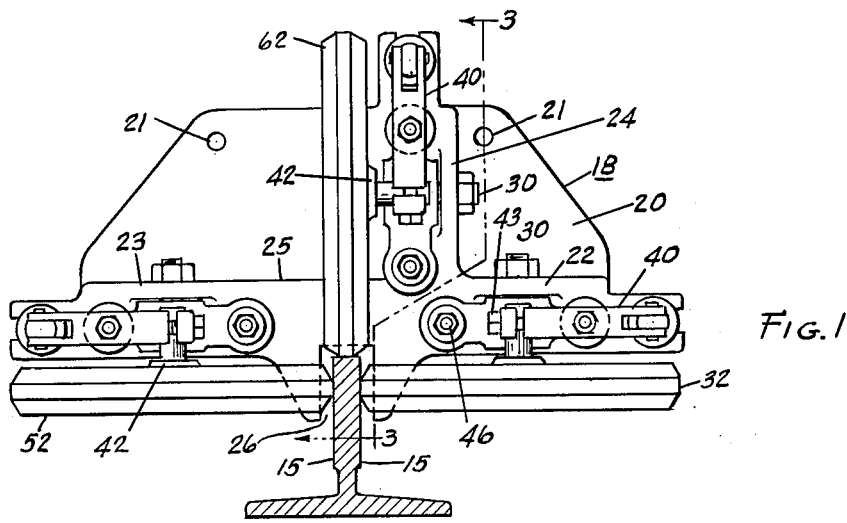
FIGURE 1 is a plan view of an elevator guide assembly of the preferred type.

In the explanation which follows it will be understood that the to be described guide assembly is used in the manner shown in FIG. 1 of Norton Patent 2,100,169. Also, although the mounting of the guide rollers in the Norton arrangement differs in some detail from that to be explained, the guide rollers themselves are generally as shown in Norton. Thus, referring to the drawing, the guide assembly comprises a stand 18 having a base 20 which is secured to a car sling as by bolts through apertures 21 in the base. A block 25 extends vertically from the base and has formed therein a groove or throat 26 into which the guide rail extends when rail and guide are in their normal relation. At the top of the block are formed lugs 22, 23 and 24. Lugs 22 and 23 extend perpendicularly from the base and parallel to the base of the guide rail; while lug 24 similarly protrudes perpendicularly from the base, but also perpendicularly to the guide rail base and in line with the blade of the rail. Each of these lugs is connected to the base by a respective rib or shoulder 29. Each lug is apertured to receive a bolt 30 which acts as a pivot for bell crank 40. Each bell crank 40 has an aperture 38 in which is pivotally mounted a front roller 32, a back roller 52 or a stem or postwise roller 62, as the case may be. Each roller is substantially the same as the others and as that shown in Norton's FIG. 5. As is there shown, each guide roller is in the form of a disc wheel having a hub 42 and a rim 39. The wheel is provided with a bearing which may be either of the ball or roller type, the outer race of which is secured in the hub 42 by any suitable means as by peening or a split ring arrangement. The inner race of the bearing is secured to the bell crank by a pivot extending through aperture 38 the diameter of which is made adjustable by set screw 43. On the outside of rim 39 there is attached a tire 41 which may suitably be fashioned of rubber, neoprene or other suitable material. This tire has a curved tread surface for running on the corresponding guide surface of the rail. The tire material is not critical other than it should be of such composition and firmness that it will resume its rotund shape after having been compressed against the rail surface for long or short periods of time. The tire may be vulcanized to the rim, and, if replacement becomes necessary, may be changed in a similar manner.

Since each bell crank 40 is like the other and the postwise one differs from the front and back side bell cranks only in that no connection is made to tie rod 50, only the front side arrangement will be described. Bell crank 40 has formed thereon a shoulder lug 44 which has formed therein an aperture through which spring mounting bolt or stud 46 passes. This stud is mounted in a threaded aperture in the rib or shoulder 29. It has mounted thereon an adjustable spring 54 similar to that shown and described in the co-pending application Serial No. 845,022, filed October 7, 1959, by W. H. Bruns which is compressed between shoulder lug 44 and nut 48 so as to urge the front roller 32 toward the left of FIG. 2 to bear against the corresponding side guide surface 15 of the T-shaped guide rail. The right arm of bell crank 40 is bifurcated to form a fork in which is pivotally mounted one end of plunger 55 of the dash pot. Similarly, the right extremity of stand 18 is bifurcated to form a conjugate fork in which is pivotally mounted the base of cylinder 56 of the dash pot. Thus, the action of spring 54 is damped in returning bell crank 40 after it has been displaced from its normal position of rest. This serves to reduce the normal period of oscillation between front and back rollers 32, 52 and their corresponding mounting assemblies. That portion of the arm of bell crank 40 intermediate the pivot point of roller 32 and its bifurcated right end has formed therein a threaded aperture 57 in which is mounted the threaded stem of adjustable stop or bumper 59—the position of which is secured by nut 60 when brought snugly against the upper surface of the arm. As will be explained later, this stop is adjusted to limit the amount the roller 32 can be deflected by the guide rail—the adjustment being made to limit the excursion to a point just short of where the rail surface would contact the edge of the groove or throat 26 to prevent the surfaces from rubbing.

The downwardly extending leg 34 of bell crank 40 is bifurcated to form a fork in which the threaded positioning nut 36 is pinned by pin 38a. It will be noted that each end of tie rod 50 is threaded and a positioning nut 36 is threaded on each end. The nuts 36 and the ends of rod 50 have formed therein and thereon right and left turning threads such that rotation of rod 50 in one direction advances each nut 36 along its thread to pull together the depending legs 34 of the bell crank 40. Similarly, the counter rotation of rod 50 separates the nuts and their connected legs. Thus, the front and back rollers 32, 52 may be pulled together or separated to increase or decrease the pressure of their tires against the rail side guide surfaces 15 by varying the angular positions of their respective bell cranks 40.

It is to be noted after the angular position of the bell cranks 40 has once been set by tie rod 50 any displacement of one bell crank in its angular rotation will cause a corresponding and similar displacement of the other, such that the side surface rollers are at all times maintained in contact with their guide surfaces. The lock nuts 37 threaded on each end of tie rod 50 serve to lock the corresponding positioning nut 36 in its desired position.

The postwise roller 62 which contacts the face surface of the guide rail is in all respects mounted similarly to the manner which has been described above for front roller 32, except that no tie rod or positioning nut is connected to the downwardly extending leg of its bell crank 40.

In practice, the rollers are adjusted initially in much the same manner as those in Norton Patent 2,100,169 and, since like there the adjustment of each guide is similar to that for the others, the adjustment of only one will be described.

Figure 2:
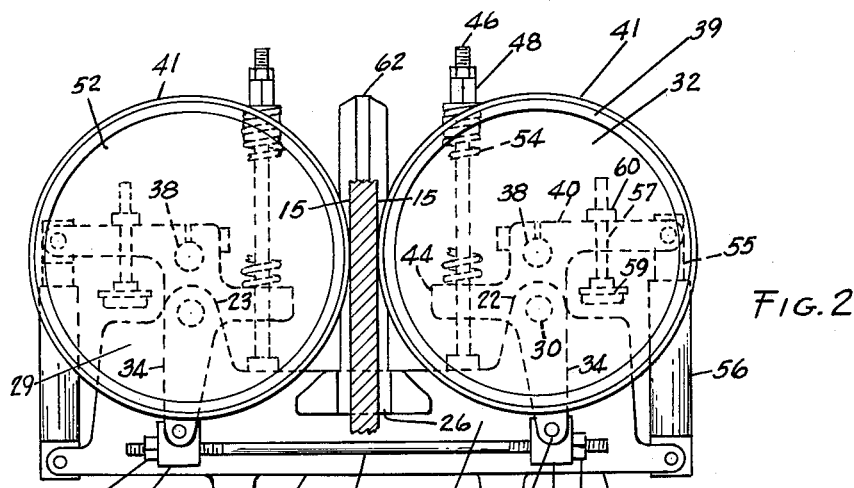
FIGURE 2 is a front view in elevation of this guide assembly.
Figure 3:
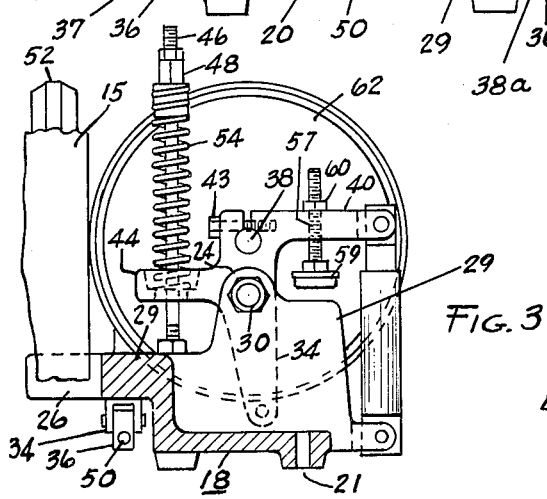
FIGURE 3 is a sectional view taken along the line 3—3 of FIGURE 1 and rotated 90 degrees to present the view in upright position.

If it be assumed that the guide of FIGURE 2 is being adjusted, the car would be deflected backward, as by a pinch bar, until the front side surface 15 of the guide rail is touching the edge of groove 26. Spring adjusting nut 48 of the spring associated with the back guide roller is adjusted downwardly to force the tire of the back roller to snugly but without force contact the back side surface 15 of the rail. This assures the back roller will at all times maintain contact with its guide surface.

The deflection of the car is slightly reduced and the adjustable stop 59 of the front guide roller is brought into contact with the top surface of its shoulder 29 such that thereafter the front guide roller cannot be deflected to such extent that rail surface 15 can hit the edge of groove 26.

The backward deflection of the car is removed and it is thereafter deflected forwardly and the process repeated whereby the adjustment of the front roller spring is made and the setting of the stop for the back roller is achieved in the manner that has been described.

Assuming the car to be balanced, the guide rail will be centered in the groove 26 when the external deflections have been removed. In this position there will be about ⅛ inch clearance between the sides of groove 26 and the front and back side rail surfaces 15 and each roller is pressing its guide surface with considerable pressure. If the car is not initially balanced the rail will not be centered in the groove and it will be necessary further to compress the spring 54 of the appropriate roller by positioning its adjusting nut 48 to bring the rail to the midgroove position. In this condition each roller will press its guide surface with considerable pressure and the pressure of one will exceed that of the other by the amount necessary to counteract the eccentric loading of the car. The exact amount of this excess will, of course, be a function of the magnitude of the unbalance load. The difference in the compression of springs 54 will be in the order of the ratio of two moment arms; one of these arms is the distance between the pivot 30 of the bell crank and the point where spring pressure is applied to shoulder lug 44. The other is the distance between bell crank pivot 30 and pivot point 38 of the roller. Whatever these are the difference between tire pressures will be appreciable and each tire pressure will be relatively large.

In this condition the setting of the rollers and their tire pressures are as in the conventional roller guide as exemplified by Norton Patent 2,100,169. In order to secure a part of the benefits of this instant invention the tie rod 50 may now be rotated in a direction to pull together the downwardly depending legs 34 of the bell cranks 40, thus moving the rollers apart and decreasing the pressure between their tires and the corresponding guide surface 15. If the car is balanced all but sufficient pressure to maintain physical contact between the roller and rail may be removed. Also, this pressure, or lack of it, will be substantially the same for both the front and back tires and will be negligible.

If the car is eccentrically loaded the tie rod 50 may be rotated until the tire of one roller is approaching the point of losing contact wtih its rail surface. In this condition the pressure of the conjugate tire on its guide surface will be only enough to compensate for the eccentric loading and to hold the guide such that the guide rail will be centrally located in groove or throat 26 in the guide base 20. The difference in pressure on the front and back side guide surfaces is the same as in the well known uncompensated guide. However, the tie rod 50 is now carrying the large opposed pressures which heretofore has existed between the roller tires and the conjugate guide surfaces—and which may be here termed static pressures for purposes of discussion.

Notwithstanding this static pressure is carried by the tie rod 50, the rollers 32, 52 are in contact with surfaces 15 in position instantly to exert the pressures exerted on them by their springs 54 if sway or increased eccentric loading cause the car to tend to assume a position in which the guide rail is not centrally located in the groove 26.

Although it may be said that the dash pot associated with the front and back rollers 32, 52 are not essential for the working of the invention, these do in fact add appreciably to the smoothness of ride and supplement noticeably the increased comfort that is derived from reducing the car noise by reducing the loads on the rollers 32, 52.

The adjustment of postwise roller 62 is carried out in substantially the same manner as described above for the front and back rollers there being, of course, no tie bar to adjust since it is not thought to be a practical necessity to tie together the postwise rollers of the separate right and left guide elements. Although such an arrangement is possible it is thought the practical advantage to be derived therefrom is minimized by the relatively small eccentric loading that usually exists in the postwise direction.

The invention does however produce an improvement in the performance of the postwise rollers. This derives from the removal of tire pressure from the front and back rollers and the substitution of the damping action of the postwise dash pot for the tracking action that disappears as the pressure between tire and guide rail surfaces are removed. In the previously known roller guide as exemplified by the Norton guide, the pressure of the back and front roller guides on their guide surfaces has made it difficult for these rollers to move over as the separation of the guide rails themselves vary. As a result a part of the sway that has been experienced in the past is thought to be caused by the inability of these rollers to allow the postwise rollers to act freely in compensating for variations in the separation of the rails. With the pressure of the side rollers removed the car floats on the postwise rollers 62 and the period of postwise oscillation is damped or reduced by the action of the associated dash pot.

Although the benefits to be derived from the use of this invention are more readily evident on high speed large capacity cars than on smaller ones of less capacity, these latter do profit from its use. The invention is capable of beneficial use in configurations differing somewhat from this described preferred embodiment thereof. Therefore, it should be recognized that the foregoing description should be taken as expository and not as of limitation.

What is claimed is:

1. In an elevator installation in which a guide rail having a flat guide surface on its face and on each of its opposed two sides is provided for guiding the passage of a car in its hoistway by coaction with a guide element that is carried by the car; said guide element comprising a plurality of pivotally mounted guide rollers, one coacting with each of said guide surfaces, each of said rollers being pivotally mounted on a standard which itself is pivotally mounted, resilient means individual to each standard and acting through its pivot causing the associated roller to exert pressure on its conjugate guide surface at all times, and rigid means adjustable in length interconnecting the standards of the side surface rollers and effective to hold these standards in fixed angular relation to each other and to hold said rollers in fixed separation irrespective of the position of the guide rail with respect to the associate guide element.

2. In an elevator installation in which a guide rail having a flat guide surface on its face and on each of its opposed two sides is provided for guiding the passage of a car in its hoistway by coaction with a guide element that is carried by the car; said guide element comprising a plurality of pivotally mounted guide rollers, one coacting with each of said guide surfaces, each of said rollers being pivotally mounted on a bell crank which itself is pivotally mounted, resilient means individual to each bell crank and acting through its pivot causing the associated roller to exert pressure on its conjugate guide surface at all times, and means adjustable in effective length interconnecting one arm of each bell crank of the side surface rollers and effective to hold these bell cranks in fixed angular relation to each other and effective to hold said side surface rollers at a predetermined separation irrespective of the position of the guide rail with respect to the associated guide element.

3. In an elevator installation in which a guide rail having a flat guide surface on its face and on each of its two sides is provided for guiding the passage of a car in its hoistway and in which a guide element for cooperation with said guide rail is carried by the car said guide element comprising a plurality of guide rollers, one for each of said guide surfaces, each said roller being pivotally mounted and maintained in resilient engagement with its associated guide surface at all times and a rigid means interconnecting the pivoted mountings in which said side surface rollers are mounted for holding these mountings in fixed angular relation to each other and in such positions that when said guide surfaces are centrally located with respect to said guide element, a portion of the forces acting to hold said rollers in engagement with said side surfaces is exerted on said rigid means whereby the pressures on said side rollers may be minimized.

4. In an elevator installation in which a guide rail having a flat guide surface on its face and on each of its opposed two sides is provided for guiding the passage of a car in its hoistway by coaction with a guide element that is carried by the car; said guide element comprising a plurality of pivotally mounted guide rollers, one coacting with each of said guide surfaces, each of said rollers being pivotally mounted on a standard which itself is pivotally mounted, resilient means individual to each standard and acting through its pivot moving the associated roller to exert pressure on its conjugate guide surface at all times, and rigid means adjustable in length interconnecting the standards of the side surface rollers and effective to hold these standards in substantially constant angular relation and in positions in which said rollers exert minimum bearing pressure on their associated side guide surfaces to hold said surfaces centrally located with respect to said guide.

5. A guide element in accordance with claim 4 wherein each pivotally mounted standard has connected thereto a dash pot check operative to retard the contracting action of the resilient means with which it is associated.

6. In an elevator installation in which a guide rail having a flat guide surface on its face and on each of its opposed two sides is provided for guiding the passage in its hoistway of a car which may be subject to eccentric loading by coaction with a guide element that is carried by the car; said guide element comprising a plurality of pivotally mounted guide rollers, one coacting with each of said guide surfaces, each of said rollers being pivotally mounted on a standard which itself is pivotally mounted, resilient means individual to each standard and acting through its pivot causing the associated roller to exert a predetermined pressure on its conjugate guide surface at all times, and rigid means adjustable in length interconnecting the standards of the side surface rollers and effective to hold these standards in positions in which said one of said side rollers exerts negligible pressure on its associated guide surface and the opposed side roller exerts only sufficient pressure on its guide surface to counteract the car's eccentric loading and to tend to maintain said guide surfaces centrally located with respect to said guide.

7. In an elevator installation in which a guide rail having a flat guide surface on its face and on each of its opposed front and back sides is provided for guiding the passage of a car in its hoistway by coaction with a guide element carried by the car, said guide element comprising a plurality of guide rollers one each of which is individual to each of said guide surfaces, means mounting each roller pivotally and in position for coaction with its associated guide surface, said mountings each being movable in such manner as to move the respective rollers towards the associated surface, resilient means individual to each roller connected to the respective roller mountings and acting to move its roller into engagement with the guide surface associated with that roller, and means operative on said front and back surface rollers for holding said rollers separated by a distance equal substantially to the thickness of the guide rail portion separating said opposed front and back guide surfaces regardless whether said guide rail is centered with respect to said guide element.

8. A guide element in accordance with claim 7 wherein a dash pot check is connected to the standard mounting the roller for engagement with said face guide surface, said check operating to retard the action of the resilient means associated with said roller.

9. A guide element in accordance with claim 7 wherein each movable standard has connected thereto a dash pot check operative to retard the action of the resilient means associated with said standard.

10. A guide element in accordance with claim 7 wherein there is associated with each movable standard an inflexible stop to limit the extent of movement of said standard in such manner as to move its guide roller toward the associated guide surface.

References Cited in the file of this patent

UNITED STATES PATENTS

| | | |
|---|---|---|
| 2,083,502 | Matthews | June 8, 1937 |
| 2,100,169 | Norton | Nov. 23, 1937 |
| 2,251,963 | Spiro | Aug. 12, 1941 |
| 2,352,820 | Spiro | Aug. 26, 1941 |
| 2,260,922 | Spiro | Oct. 28, 1941 |
| 2,265,086 | Spiro | Dec. 2, 1941 |

FOREIGN PATENTS

| | | |
|---|---|---|
| 784,798 | Great Britain | Oct. 16, 1957 |
| 787,386 | Great Britain | Dec. 4, 1957 |